(12) United States Patent
Rosenbusch (10) Patent No.: US 11,236,732 B2
(45) Date of Patent: Feb. 1, 2022

(54) GENERATOR, MEASURING DEVICE, USE OF A MEASURING DEVICE, METHOD FOR OPERATING A GENERATOR, WIND ENERGY INSTALLATION AND METHOD FOR OPERATING A WIND ENERGY INSTALLATION

(71) Applicant: Wobben Properties GmbH, Aurich (DE)

(72) Inventor: Peter Rosenbusch, Rueil-Malmaison (FR)

(73) Assignee: Wobben Properties GmbH, Aurich (DE)

( * ) Notice: Subject to any disclaimer, the term of this patent is extended or adjusted under 35 U.S.C. 154(b) by 341 days.

(21) Appl. No.: 16/552,482

(22) Filed: Aug. 27, 2019

(65) Prior Publication Data
US 2019/0383271 A1    Dec. 19, 2019

Related U.S. Application Data

(63) Continuation-in-part of application No. PCT/EP2018/054859, filed on Feb. 28, 2018.

(30) Foreign Application Priority Data

Mar. 2, 2017 (DE) .................. 10 2017 104 329.2

(51) Int. Cl.
| | |
|---|---|
| *G01B 3/44* | (2006.01) |
| *G01B 3/52* | (2006.01) |
| *F03D 17/00* | (2016.01) |
| *H02K 11/24* | (2016.01) |
| *F03D 80/80* | (2016.01) |

(Continued)

(52) U.S. Cl.
CPC ............ *F03D 17/00* (2016.05); *F03D 80/82* (2016.05); *G01L 5/0019* (2013.01); *H02K 7/183* (2013.01); *H02K 11/24* (2016.01); *H02K 17/30* (2013.01)

(58) Field of Classification Search
CPC ....... F03D 17/00; F03D 80/82; G01L 5/0019; H02K 17/183; H02K 11/24; H02K 17/30
See application file for complete search history.

(56) References Cited

U.S. PATENT DOCUMENTS

| | | | |
|---|---|---|---|
| 5,907,403 A * | 5/1999 | Andrews ................ | G01D 5/268 356/480 |
| 6,721,470 B2 | 4/2004 | Bosselmann et al. | |

(Continued)

FOREIGN PATENT DOCUMENTS

| | | |
|---|---|---|
| CN | 101205026 A | 6/2008 |
| CN | 102150349 A | 8/2011 |

(Continued)

*Primary Examiner* — Tulsidas C Patel
*Assistant Examiner* — Thomas K Quigley
(74) *Attorney, Agent, or Firm* — Seed Intellectual Property Law Group LLP (57) ABSTRACT

A generator, in particular of a wind power installation, for generating electric current, comprising a rotor and a stator having stator teeth and grooves arranged between said stator teeth for receiving at least one stator winding, wherein a measuring device is provided to determine the deflection of at least one stator tooth of the stator in connection with the generator, wherein the measuring device is connected to at least one measuring unit, which is embodied as a strain gauge.

14 Claims, 8 Drawing Sheets

(51) Int. Cl.
*G01L 5/00* (2006.01)
*H02K 7/18* (2006.01)
*H02K 17/30* (2006.01)

(56) References Cited

U.S. PATENT DOCUMENTS

| | | | |
|---|---|---|---|
| 8,860,239 B2 | 10/2014 | Hein | |
| 9,143,071 B2 | 9/2015 | Diedrichs | |
| 10,795,082 B1* | 10/2020 | Jacob | G02B 6/12004 |
| 11,048,344 B1* | 6/2021 | Drezet | H01F 7/0205 |
| 11,131,291 B2* | 9/2021 | Messing | F03D 7/0224 |
| 2005/0082839 A1* | 4/2005 | McCoin | F03D 9/25 |
| | | | 290/55 |
| 2006/0150743 A1* | 7/2006 | Lequesne | G01L 1/127 |
| | | | 73/779 |
| 2008/0168844 A1* | 7/2008 | Lequesne | G01L 1/127 |
| | | | 73/779 |
| 2009/0232183 A1 | 9/2009 | Salem et al. | |
| 2009/0249885 A1* | 10/2009 | Shkel | G01B 7/22 |
| | | | 73/780 |
| 2010/0066315 A1 | 3/2010 | Diatzikis et al. | |
| 2015/0002153 A1 | 1/2015 | Ting et al. | |
| 2016/0282173 A1 | 9/2016 | Arend | |
| 2019/0383271 A1* | 12/2019 | Rosenbusch | H02K 17/30 |

FOREIGN PATENT DOCUMENTS

| | | |
|---|---|---|
| CN | 105783757 A | 7/2016 |
| DE | 19962668 C1 | 12/2000 |
| DE | 102009003608 A1 | 9/2009 |
| DE | 102011105427 A1 | 12/2012 |
| GB | 2485808 A | 5/2012 |
| JP | 2009091923 A | 4/2009 |
| RU | 2540415 C2 | 2/2015 |
| RU | 2557260 C1 | 7/2015 |
| WO | 2015/002153 A1 | 1/2015 |
| WO | 2015/120108 A1 | 8/2015 |

* cited by examiner

GENERATOR, MEASURING DEVICE, USE OF A MEASURING DEVICE, METHOD FOR OPERATING A GENERATOR, WIND ENERGY INSTALLATION AND METHOD FOR OPERATING A WIND ENERGY INSTALLATION

BACKGROUND

Technical Field

The present invention relates to a generator, in particular of a wind power installation. The invention further relates to a measuring device for a generator. The invention furthermore relates to a method for operating a generator. The invention further relates to a wind power installation and to a method for operating a wind power installation.

Description of the Related Art

Wind power installations are generally known and they generate electric current from wind by means of a generator. Provided herein, a generator is intended to be understood as meaning, in particular, a synchronous generator, preferably a ring generator, an asynchronous generator or a doubly-fed asynchronous generator.

WO 2015/002153 discloses a torque estimation apparatus for an electric motor, which detects a magnitude that is dependent on a deformation arising in stator teeth when the electric motor is driven, wherein the stator teeth are constituent parts of a stator. Based on the detected magnitude that is dependent on the deformation arising in the stator teeth, the torque estimation apparatus estimates the magnitude of the torque generated by the electric motor.

DE 10 2011 105 427 A1 relates to an electric machine, comprising a rotor having a winding head; a stator laminated core; an air gap between the rotor and the stator or the winding head and the stator; a monitoring device for detecting the state of the areas bounding the air gap; the monitoring device comprises a conductor mounted on the rotor, an energy source connected to the conductor and also a detector for detecting the flow of energy in the conductor.

The aerodynamic rotor is caused to rotate by wind as intended and thereby drives an electromechanical rotor of the generator. Therefore, a pole wheel of the generator is rotated relative to a stator of the generator. Owing to the relative rotation of the pole wheel with respect to the stator, electric current is generated in the stator, with the result that kinetic energy of the wind is converted to electrical energy.

The magnetic interaction arising between an individual stator tooth and the rotor poles moving past leads to magnetic forces. The magnetic interaction produces a force on the stator tooth that leads to a deflection and/or deformation of the stator tooth and of the supporting structure of the generator. Said deflection or deformation can cause audible narrow-band sounds, which is considered to be additional pollution for the environment. Furthermore, said periodic deformation can influence the life of the generator.

BRIEF SUMMARY

The present invention relates to a generator, in particular of a wind power installation, for generating electric current, comprising a rotor and a stator having stator teeth and grooves arranged between said stator teeth for receiving at least one stator winding. The invention further relates to a measuring device for a generator. The invention furthermore relates to a method for operating a generator. The invention further relates to a wind power installation and to a method for operating a wind power installation.

Provided is a generator and method of determining the deflection of at least one stator tooth without interfering in the geometry of the generator.

A generator may be, in particular, a synchronous generator, an asynchronous generator or a doubly-fed asynchronous generator. An example of a synchronous generator, wherein other generators, including other synchronous generators, can be used as well, is a multi-pole synchronous ring generator of a wind power installation. Such a multi-pole synchronous ring generator of a wind power installation has a multiplicity of stator teeth, in particular at least 48 stator teeth, frequently even significantly more stator teeth, such as, in particular, 96 stator teeth or even more stator teeth. The magnetically active region of the synchronous generator, namely both of the rotor and of the stator, is arranged in an annular region around the axis of rotation of the synchronous generator.

The stator is provided with teeth and grooves arranged between said teeth. The grooves receive a stator winding or a plurality of stator windings, with the result that the stator winding is arranged through the grooves and around the stator teeth. A measuring device is provided to determine the deflection of at least one stator tooth of the stator in connection with the generator, wherein the measuring device is connected to at least one measuring sensor, which is embodied as a strain gauge and arranged in the air gap between the rotor and the stator. A deformation of the stator tooth caused by the magnetic interaction generates a signal that represents a strain, said signal being transferred from the measuring sensor to the measuring device connected to said measuring sensor for signaling purposes. In contrast to measurement for example of the torque by means of acceleration sensors, which are arranged on the aerodynamic rotor, generally on the rotor blades thereof, or on the generator structure, that is to say on the elements manufactured in steel production, the deflection is determined in the air gap of the generator at the location of the conversion from mechanical to electrical energy. In this way, the electromechanical energy conversion can be measured directly.

A further advantage consists in the fact that the measuring sensor embodied as a strain gauge and arranged in the air gap is not influenced by, in particular mechanical, oscillations that do not originate from the magnetic forces. In addition, strain gauges are space-saving and cost-effective. This also makes it possible to retrofit existing generators with at least one measuring sensor. It is possible to determine the deflection of a single stator tooth caused by the magnetic forces acting thereon by means of the strain gauge without having to change the magnetically active part for arranging the at least one measuring sensor in any way.

To this end, the at least one measuring sensor may be embodied as an electrical or optical strain gauge. The use of an optical strain gauge has the advantage that the measurement signals generated thereby are not influenced by the electromagnetic fields. In addition, the optical strain gauge is connected to the measuring device for signaling purposes by means of an optical fiber line. This makes it possible to arrange the cabling in an installation-space-saving manner, since a multiplicity of sensors with different base wavelengths can be connected to one another by using an optical fiber line. In addition, the measuring device can be arranged at a great distance from the generator. Compared to an optical strain gauge, an electrical strain gauge in some embodiments has the advantage of a lower layer thickness, which is favorable during installation in the air gap between the rotor and the stator.

Furthermore, the measuring device can be configured to determine a deflection of the stator tooth from a change in the signals generated by the measuring sensor. The deflection determined by the measuring device from the signals of the measuring sensor can be used to actuate and monitor the operation of the generator. In particular, the time profile of the deflection of the at least one stator tooth can be determined by the measuring device.

The measuring sensor is arranged in the air gap between the stator and the rotor so as to span at least two directly or indirectly adjacent stator teeth and to extend in the tangential direction. The arrangement is effected in the rotation plane of the rotor in a manner projected onto the rotation plane of the rotor at two directly or indirectly adjacent stator teeth, with the result that the tangential deflection of the stator tooth can be detected. Indirectly adjacent stator teeth are spaced apart from one another by at least one stator tooth located between said indirectly adjacent stator teeth. The arrangement that spans directly adjacent stator teeth generally delivers a higher signal-to-noise ratio. The extent of the measuring sensor can in this case lie in the rotation plane or also comprise a component in the axial direction. Owing to the axial component, an axial deflection of the stator tooth can be detected in addition to the tangential deflection.

The measuring sensor embodied as an optical strain gauge comprises an optical waveguide section, which is preferably arranged on support elements arranged at a distance from one another by way of the groove between the stator teeth. The support elements are preferably plate-shaped elements with a low material thickness. The support elements preferably comprise a non-magnetic and electrically non-conductive material or are made thereof. In this case, the support elements should be made of a relatively rigid material. The respective support element is preferably arranged on respective stator teeth adjacent to one another and spaced apart at least by way of the groove. There may also be provision for an arrangement of the measuring sensor that bridges indirectly adjacent stator teeth, that is to say two stator teeth that are spaced apart from one another by way of at least one further stator tooth. The optical waveguide section is fixed by way of its free ends to the respective support element. One advantage of the support elements is, for example, that a distance from the groove sealing wedge or from the surface of the stator teeth exists, inter alia, on account of the height of the support elements, with the result that the optical waveguide section is arranged in a free-swinging manner. The optical waveguide section of the measuring sensor spans at least the groove running between the two adjacent stator teeth. The optical waveguide section of the measuring sensor can also be arranged on the surface of one of the adjacent stator teeth without using support elements.

The optical waveguide section preferably has at least one Bragg grating. The optical waveguide section having Bragg gratings is positioned substantially centrally between the adjacent stator teeth whose deflection is to be detected. The groove located between the stator teeth is generally covered by a groove sealing wedge, which returns somewhat behind the surface of the stator teeth. Therefore, the part of the optical waveguide section containing the Bragg gratings can be arranged in a freely swinging manner between the adjacent stator teeth. The Bragg gratings have a large number of reflection points, which are inscribed in the optical waveguide section at a uniform distance from one another. Strains of the optical waveguide section that are applied by the deflection of the stator teeth change the distance between the reflection points. The wavelength of the light reflected by said reflection points with constructive interference now depends on the distance between said reflection points. Therefore, the wavelength of the reflection peak changes upon a strain.

One advantageous development makes provision for at least two measuring sensors having optical waveguide sections to be arranged on adjacent stator teeth, said stator teeth having an orientation rotated by an angle of, for example, 45° or −45° with respect to the groove spanned by said stator teeth. The at least two measuring sensors or the respective support elements are in this case arranged in the axial direction of the stator in a manner offset from one another, which makes it possible to evaluate both a tangential and an axial deflection of the adjacent stator teeth. Of course, other arrangements of the measuring units, in particular at different angles with respect to one another and/or with more than two measuring sensors, are also conceivable.

The at least two measuring sensors are arranged with an orientation of 45° with respect to the spanned groove by way of placing the support elements in a substantially x-shaped manner. In this case, the optical waveguide sections of the at least two measuring sensors cross over.

An arrangement with an orientation of −45° with respect to the groove is achieved by way of a substantially v-shaped arrangement of the optical waveguide sections. In this arrangement, the optical waveguide sections of the measuring sensors do not touch or cross.

The arrangement of at least two measuring sensors on two adjacent stator teeth with an orientation inclined at an angle to the groove makes it possible to determine both the tangential deflection and the axial deflection. In this case, in particular at the preferred angle between the waveguide sections, the sum of the two signals of the measuring sensors is a measure of the tangential deflection and the difference between said two signals is a measure of the axial deflection of the stator tooth. Other angles require trigonometric conversions, where appropriate.

In preferred configurations, a greater number of measuring sensors can also be provided, for example on various stator teeth and/or at both ends of the stator teeth in the axial direction.

Furthermore, the measuring device can be configured to determine a torque.

The generator can be in the form of a synchronous generator, an asynchronous generator or a doubly-fed asynchronous generator. A common feature of these designs of generators is that they have a stator and a rotor, which are spaced apart from one another by way of an air gap, and that magnetic interactions between the rotor and the stator can result in deflections, for example of stator teeth, being produced, which lead to undesirable audible noises.

Provided is a measuring device for a generator, in particular of a wind power installation, for generating electric current. The generator comprises a rotor and a stator having stator teeth and grooves arranged between said stator teeth for receiving a stator winding, wherein the measuring device is configured to determine the deflection of at least one stator tooth of the stator in connection with the generator. To this end, the measuring device has at least one measuring sensor, which is embodied as a strain gauge. In particular, the at least one measuring sensor is embodied as an optical strain gauge.

Provided is a method for operating a generator, in particular of a wind power installation, for generating electric current, comprising a rotor and a stator having stator teeth and grooves arranged between said stator teeth for receiving a stator winding, wherein a measuring device having at least one measuring sensor embodied as a strain gauge is operated to determine the deflection of at least one stator tooth of the stator in connection with the generator, wherein the measurement values representing the deflection of at least one stator tooth that are recorded by the measuring sensor are evaluated by the measuring device.

In this case, the generator depending on the determined deflection of at least one of the stator teeth, the field current of the generator or the current tapped at the generator can be actuated. In addition, the deflections of at least one stator tooth, preferably of a plurality of stator teeth, that are determined by the measuring device can be used to be able to infer the life of the generator. Furthermore, the determination of the deflection permits conclusions about the homogeneity of the electromagnetic field in the air gap.

Provided is a method for operating a wind power installation, wherein a generator is controlled or regulated based on measurement values of at least one measuring sensor in the form of a strain gauge and arranged in the air gap between the stator and the rotor.

BRIEF DESCRIPTION OF THE SEVERAL VIEWS OF THE DRAWINGS

Further embodiments of the invention result from the exemplary embodiments explained in more detail with reference to the drawings. In the drawing.

DETAILED DESCRIPTION

Figure 1:
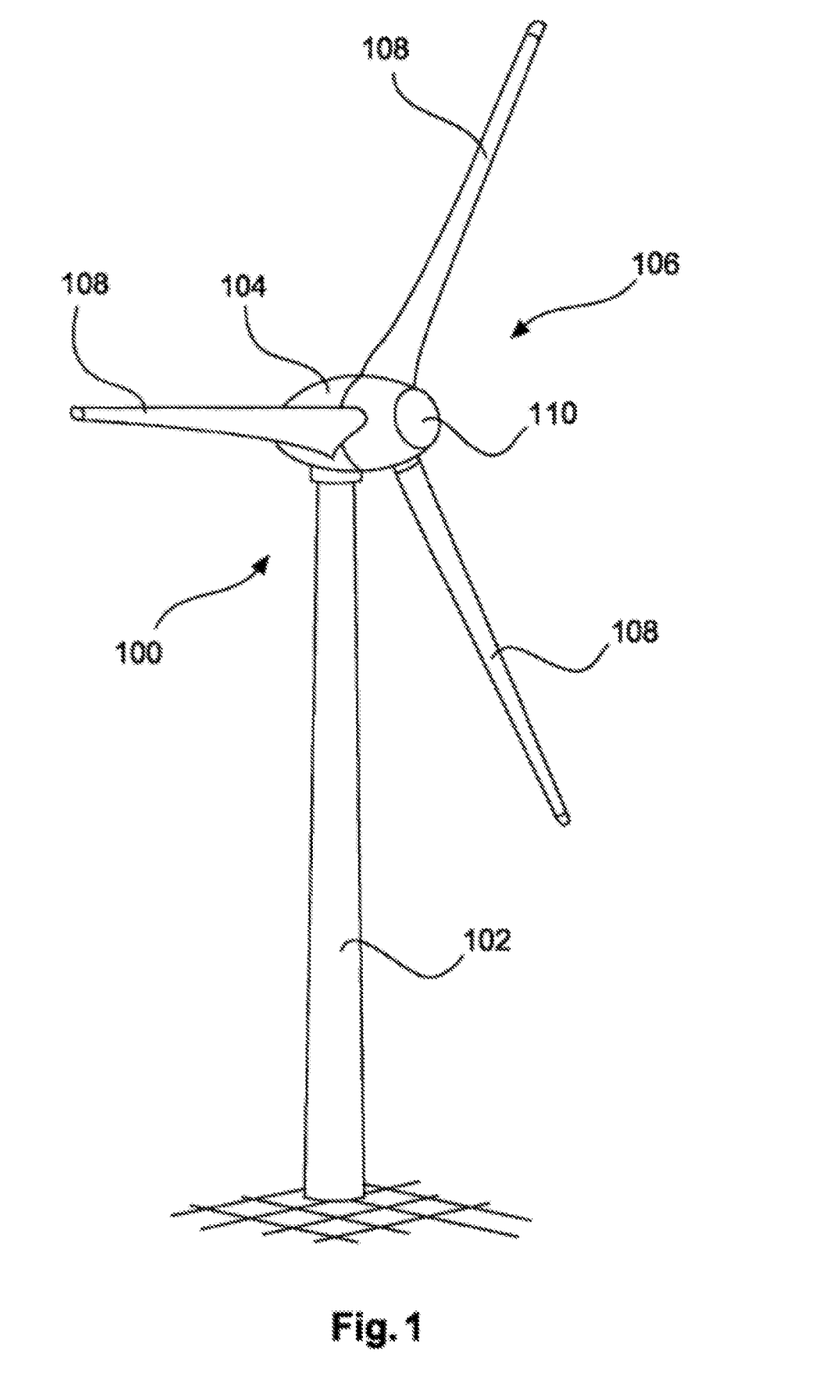
FIG. 1 shows a wind power installation.

FIG. 1 shows a schematic representation of a wind power installation according to the invention. The wind power installation 100 has a tower 102 and a nacelle 104 on the tower 102. On the nacelle 104 there is provision for an aerodynamic rotor 106 with three rotor blades 108 and a spinner 110. When the wind power installation is in operation, the aerodynamic rotor 106 is set in rotation by the wind and thus also turns a rotor of a generator, which is coupled directly or indirectly to the aerodynamic rotor 106. The electric generator is arranged in the nacelle 104 and generates electrical energy. The pitch angles of the rotor blades 108 can be changed by pitch motors at the rotor blade roots 108b of the respective rotor blades 108.

Figure 2:
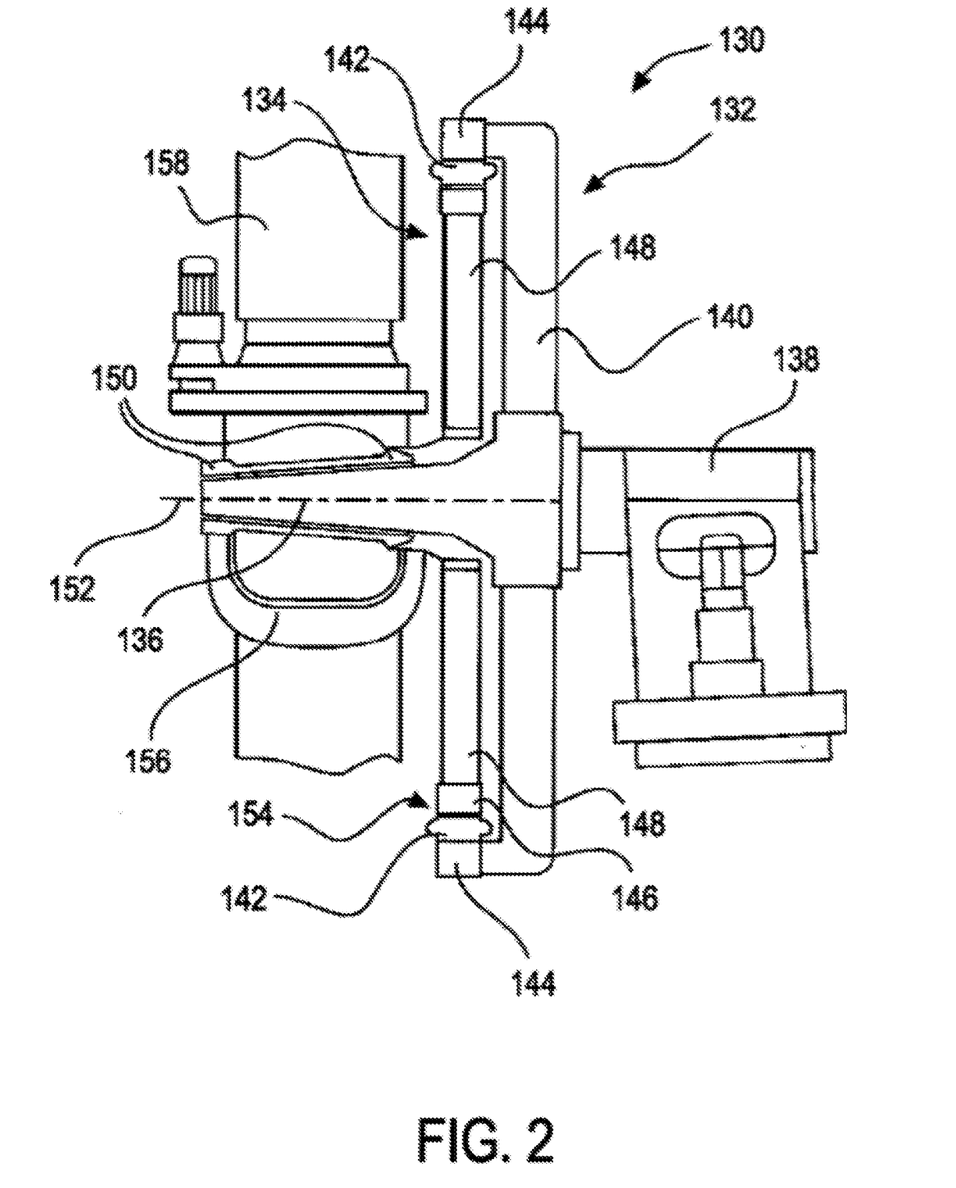
FIG. 2 shows a schematic side view of a synchronous generator.

FIG. 2 shows a schematic side view of a generator embodied as a synchronous generator 130. Said generator has a stator 132 and an electromechanical rotor 134 mounted such that it can rotate relative to said stator, and is secured by way of its stator 132 to a machine support 138 by means of a journal 136. The stator 132 has a stator support 140 and stator teeth 142 embodied as stator laminated cores, which form stator poles of the synchronous generator 130 and are secured by means of a stator ring 144 to the stator support 140.

The electromechanical rotor 134 has rotor pole shoes 146, which form the rotor poles and are mounted on the journal 136 by means of a rotor support 148 and bearings 150 such that they can rotate about the axis of rotation 152. The stator laminated cores or stator teeth 142 and rotor pole shoes 146 are separated by only a narrow air gap 154, which is a few mm thick, in particular less than 6 mm, but has a diameter of several meters, in particular more than 4 m.

The stator teeth 142 and the rotor pole shoes 146 form in each case one ring and, together, are also annular, so that the synchronous generator 130 is a ring generator. The electromechanical rotor 134 of the synchronous generator 130 intentionally rotates together with the rotor hub 156 of the aerodynamic rotor 106, bases of rotor blades 158 of said aerodynamic rotor being indicated.

Figure 3:
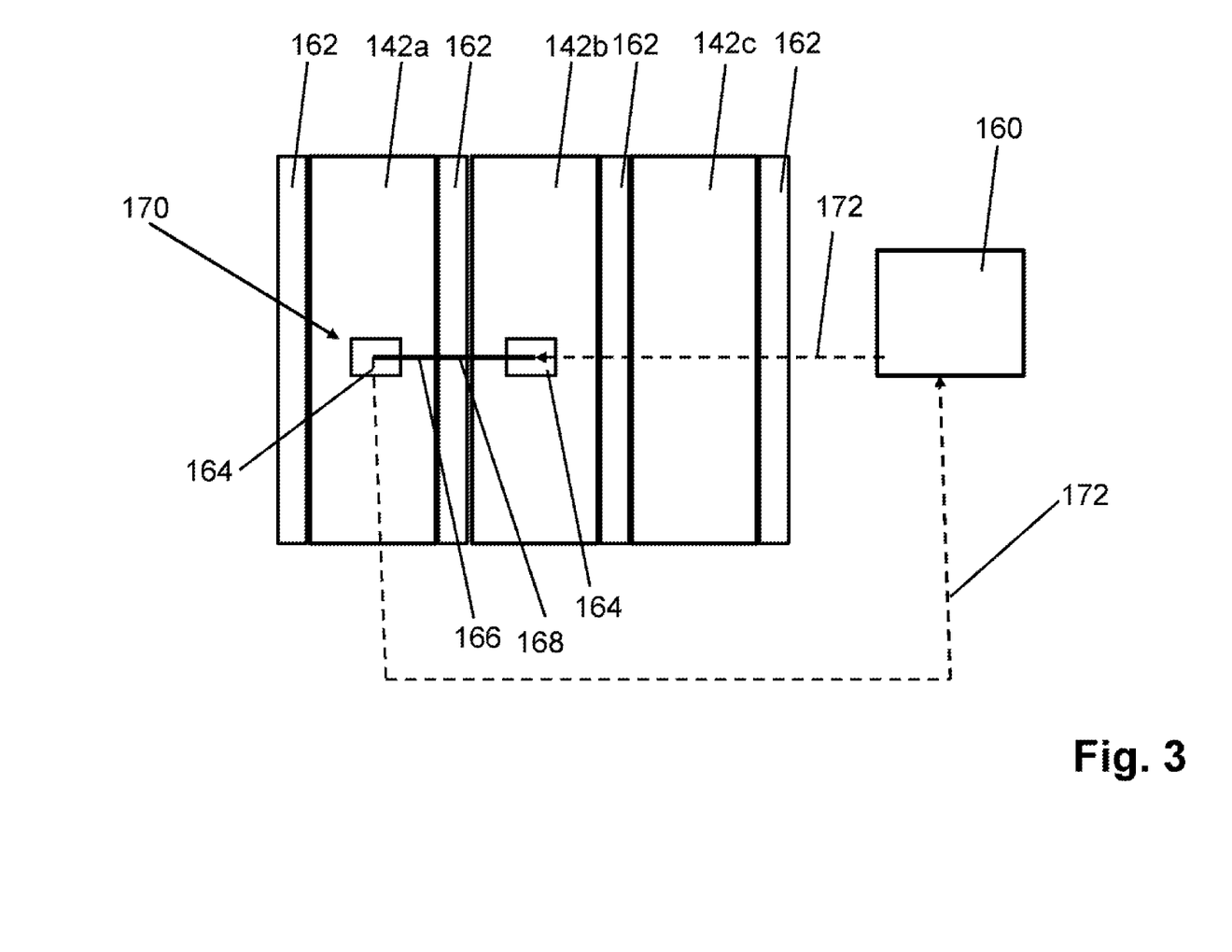
FIG. 3 shows a schematic partial view of a stator having a measuring device comprising a measuring sensor.

The illustration in FIG. 3 shows a schematic partial view of a stator 132 having a measuring device 160. The schematic partial view shows individual surface sections of adjacent stator teeth 142a, 142b, 142c of the stator 132, said stator teeth facing the rotation plane of the electromechanical rotor 134. The stator teeth 142a, 142b, 142c are each spaced apart from one another by way of a groove 162. Windings can run within said grooves 162, said windings being arranged around the stator laminations or stator teeth 142a, 142b, 142c.

The measuring device 160 is coupled to at least one measuring sensor 170, which is embodied as an optical strain gauge. The at least one measuring sensor 170 comprises an optical waveguide section 166 consisting of optical fibers and having what are known as Bragg gratings 168. The Bragg gratings 168 acting as optical interference filters are inscribed or impressed into the optical fibers of the waveguide section 166, said Bragg gratings producing a reflection wavelength proportional to a detected strain c of the waveguide section 166.

The at least one measuring sensor 170 has at least the end side arranged on support elements 164, which are arranged on both sides of the groove 162 on the surfaces of two adjacent stator teeth 142 whose deflection is intended to be determined. In this case, the groove 162 is spanned by the at least one measuring sensor 170. An arrangement of the measuring sensor directly on the surface of a stator tooth and without providing support elements 164 is likewise conceivable.

For better illustration, the pair of stator teeth 142 whose deflection is intended to be determined is denoted hereinafter as front stator tooth 142a and rear stator tooth 142b. In this case, the stator tooth 142a, as seen in the direction of rotation of the electromechanical rotor 134, is the front stator tooth, the stator tooth 142b correspondingly being the rear stator tooth.

The waveguide section 166 of the at least one measuring sensor 170 is connected to the measuring device 160 for signaling purposes by means of one or more signal lines 172. As an alternative, a plurality of measuring sensors can be connected to one another by signal lines and this chain is connected to at least one measuring device. The signal lines 172 are embodied as optical fiber lines. The signal lines 172 embodied as optical fiber lines have the advantage that they are distinguished by compact dimensions, as a result of which an installation-space-saving arrangement in the synchronous generator 130, or in the air gap between the electromechanical rotor 134 and the stator 132, is possible. In addition, optical fiber lines are insensitive to electromagnetic fields, with the result that the signal transmission from the at least one measuring sensor 170 to the measuring device 160 is not influenced. The measuring device 160 can be arranged at a great distance from the at least one measuring sensor 170. The at least one measuring sensor 170 embodied as an optical strain gauge contributes to a lower cabling outlay. A plurality of optical strain gauges can be integrated within a single optical fiber line by virtue of one signal line 172 connecting a plurality of measuring sensors 170 of different base wavelengths to one another. Therefore, the optical measuring chain also conforms to the individual requirements in the application in the air gap between the electromechanical rotor 134 and the stator 132 of the synchronous generator 130.

The measuring device 160 may be digital logic or digital circuitry, such as a controller or processor, including a microprocessor, a microcontroller, a central processing unit, among others.

As support elements 164, plate-shaped elements are applied, preferably adhesively bonded, to the surfaces of the adjacent stator teeth 142a, 142b. The support elements 164 are made of a non-magnetic and electrically non-conductive material. The material used for the support elements 164 should in this case possess a certain rigidity. In the exemplary embodiment illustrated, the support elements 164 are made of glass. As an alternative, the support element 164 may be made of ceramic or plastic or, as described, support elements can even be omitted completely.

The magnetic forces arising between an individual stator tooth 142 and the rotor poles 146 moving past lead to a magnetic interaction between same and the stator teeth 142. The magnetic interaction causes a deflection of the respective stator tooth 142, which leads to a deformation of the stator tooth 142.

The waveguide section 166 applied to the surface of the adjacent stator teeth 142a, 142b by means of the support elements 164 and having Bragg gratings 168 impressed at a uniform distance undergoes a determinable strain c due to said deformation. The wavelength of the light reflected by said reflection points with constructive interference now depends on the distance between said reflection points. Owing to the strain c of the waveguide section 166 as a result of the deformation of the front stator tooth 142a, the reflected Bragg wavelength changes of account of a change of distance between the individual Bragg gratings 168. Therefore, upon deflection or deformation of the front stator tooth 142a, the wavelength of the reflection peak changes.

The waveguide section 166 is arranged on the support elements 164 in such a way that the Bragg gratings 168 are located substantially centrally between the front stator tooth 142a and the rear stator tooth 142b. Since the groove 162 is located between the stator teeth 142a, 142b and a groove sealing wedge that seals the respective groove 162 typically returns somewhat behind the surface of the stator teeth 142, the part of the waveguide section 166 containing the Bragg grating 168 is freely swinging. The waveguide section 166 is arranged perpendicular to the profile of the groove 162, that is to say in the rotation plane of the electromechanical rotor 134. Owing to this arrangement of at least one measuring sensor 170, the tangential deflection of the adjacent stator teeth 142a, 142b can be determined.

Figure 4:
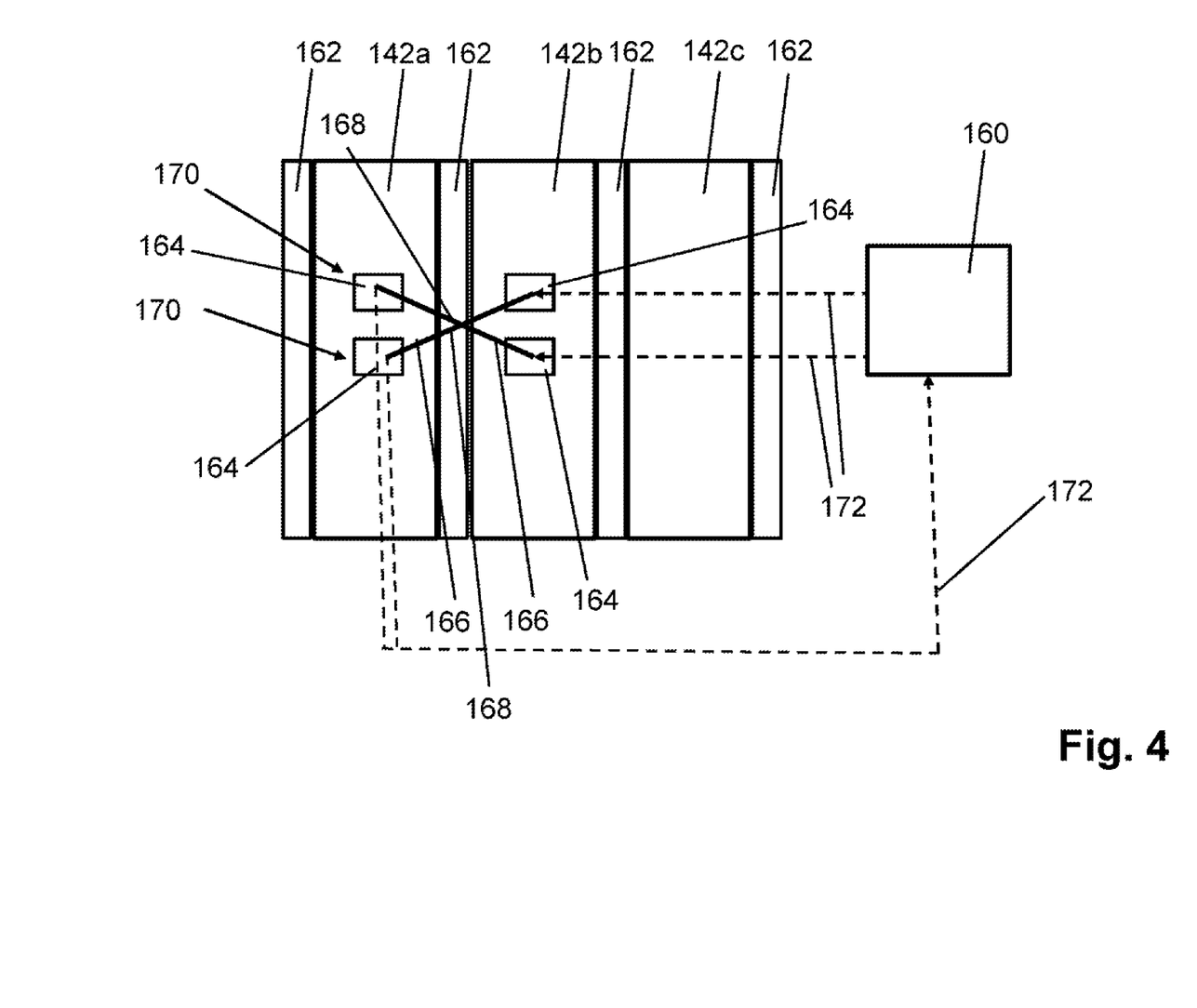
FIG. 4 shows a schematic partial view of a stator having a measuring device comprising two measuring sensors.

The illustration in FIG. 4 shows a schematic partial view of a stator 132 having a measuring device 160 and two measuring sensors 170. This embodiment differs from the previously described embodiment in that the measuring device 160 comprises two measuring sensors 170, which are arranged substantially in an x-shaped manner. That is to say the part of the respective waveguide section 166 containing the Bragg grating 168 is arranged in the region of the groove 162 so that they overlap one another or cross over. To this end, the waveguide sections 166 each have an orientation that is rotated by an angle of 45° with respect to the groove 162. The respective support elements 164 holding a waveguide section 166 are arranged in the axial direction of the front and rear stator teeth 142a, 142b in a manner offset from one another. Otherwise, the design of the two measuring sensors 170 does not differ from that of the previously described measuring sensor 170. By means of said arrangement of the measuring sensors 170, a tangential and an axial deflection of the stator teeth 142a, 142b can be determined simultaneously. To this end, the measuring device 160 determines the tangential deflection from the sum of the two signals representing the strain c of the waveguide sections 166 and the axial deflection of the stator teeth 142a, 142b from the difference between said signals. Signal lines 172 embodied as optical fiber lines are provided for transmission.

Figure 5:
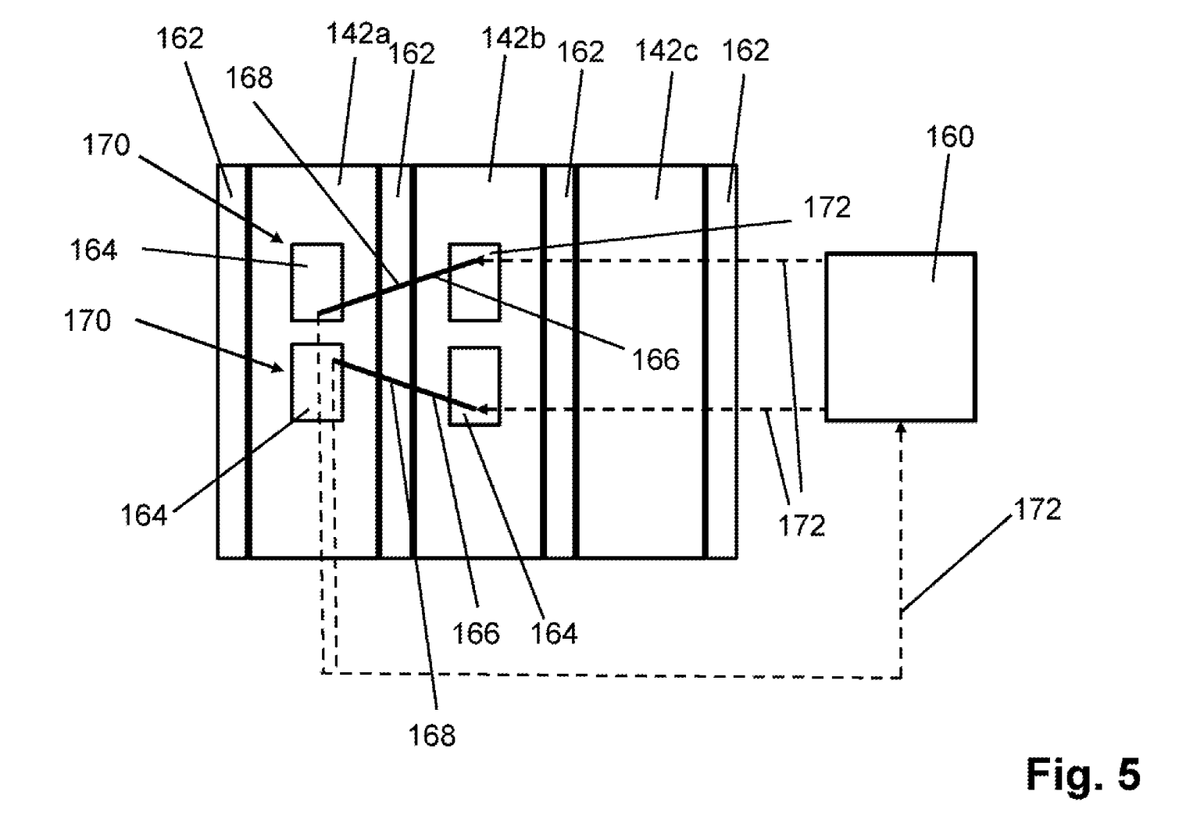
FIG. 5 shows a schematic partial view of the stator having the measuring device according to FIG. 4 in a substantially v-shaped arrangement of the two measuring sensors.

The illustration in FIG. 5 shows a schematic partial view of the stator 132 having the measuring device 160 according to FIG. 4 in a substantially v-shaped arrangement of the two measuring sensors 170. To this end, the waveguide sections 166 each have an orientation that is rotated by an angle of −45° and 45° with respect to the groove 162. The arrangement of the two measuring sensors 170 is effected in this case in a contactless and overlap-free manner. As already described previously, the parts of the respective waveguide section 166 in which the Bragg gratings 168 are located are located substantially centrally between the stator teeth 142a, 142b.

Figure 6:
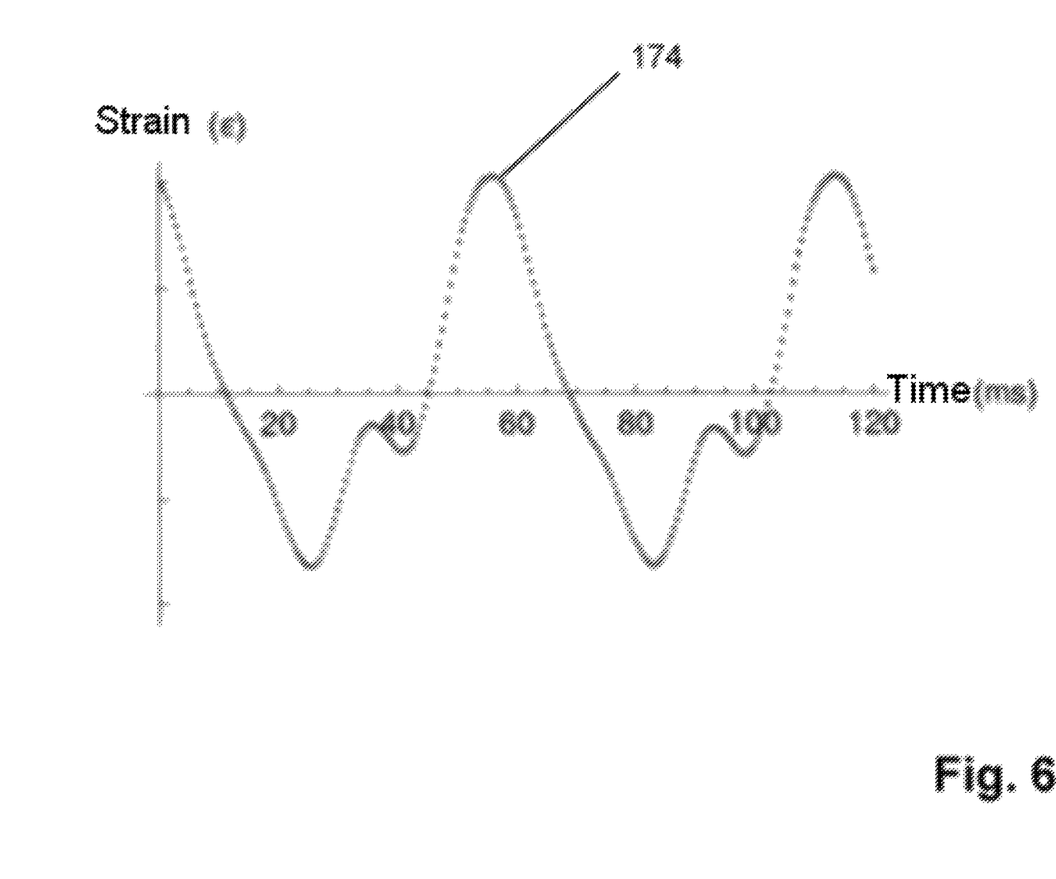
FIG. 6 shows a strain/time graph.

FIG. 6 illustrates a strain/time graph which represents the time profile 174 of the strain c of the waveguide section 166 detected by means of the measuring sensor 170. The evaluation of the signals detected by the measuring device 160 delivers as result the strain c of the measuring sensor 170, that is to say of the waveguide section 166, as a function of time.

Figure 7:
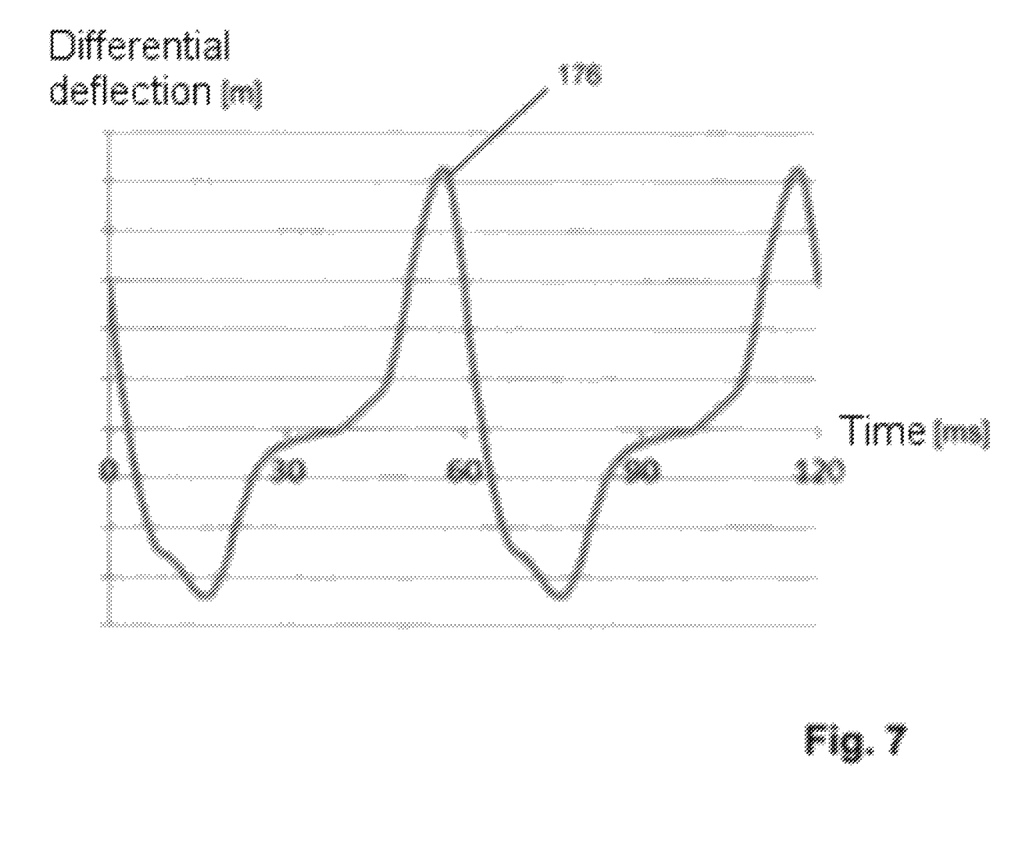
FIG. 7 shows a graph of a profile of a differential deflection of adjacent stator teeth.

This result is converted to a differential deflection of the adjacent stator teeth 142 by means of the measuring device 160. To this end, the free length of the waveguide section 166 between the adjacent stator teeth 142a, 142b is determined. In this case, the dimensions of the respective stator teeth 142a, 142b and the groove 162 can be used for calibration. The differential deflection 174 of the adjacent stator teeth 142a, 142b that is detected by the measuring sensor 170 results from the product of the strain c and the free length of the waveguide section 166. The illustration in FIG. 7 shows a graph of a profile 176 of a differential deflection of the adjacent stator teeth 142a, 142b.

To determine the deflection of an individual stator tooth 142a, 142b, it is assumed that the deflection of each stator tooth 142a, 142b has an identical amplitude but the timings are staggered. Said timing stagger Δt in seconds can be calculated from the speed n in revolutions per minute of the electromechanical rotor 134 during measurement and the number N of stator teeth 142 based on the formula below.

$$\Delta t = 60/(n*N).$$

Figure 8:
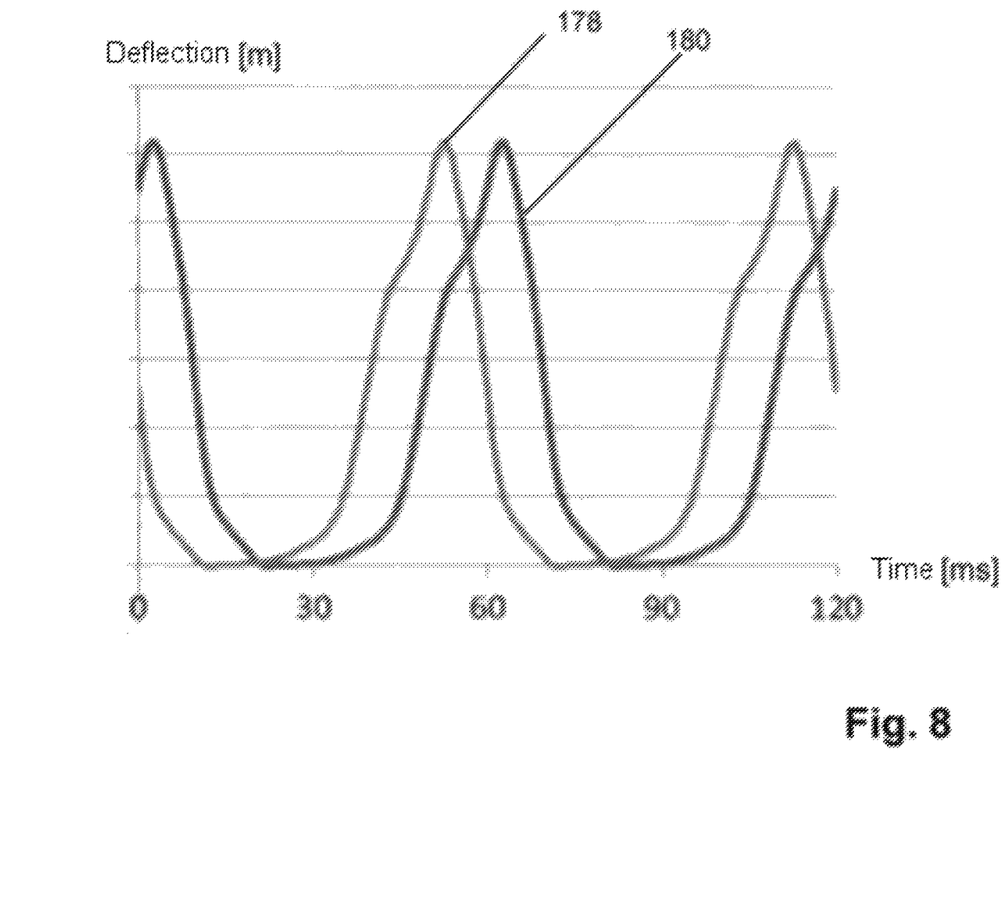
FIG. 8 shows a graph of a determined profile of the deflection of two adjacent stator teeth.

FIG. 8 shows an illustration of a graph of profiles 178, 180 of the deflection of the adjacent stator teeth 142a and 142b that are determined according to the above formula. The profile 178 represents the deflection of the stator tooth 142a in front in the direction of rotation of the electromechanical rotor 134, while the profile 180 represents the deflection of the stator tooth 142*a* at the rear in the direction of rotation of the electromechanical rotor 134.

To operate the synchronous generator 130, it is actuated by the measuring device 160. To this end, the measurement values representing the deflection of at least one stator tooth 142 that are recorded by the at least one measuring sensor 170 are evaluated by the measuring device 160. Depending on the determined deflection of at least one stator tooth 142, the field current of the synchronous generator 1 or the current tapped at the synchronous generator 1 is actuated. In this way, the occurrence of harmonics as a result of the deflection of the stator teeth, caused by the deflection of the stator teeth 142, can be influenced in order to reduce the development of noise.

Furthermore, the deflections of at least one stator tooth 142 that are determined by the measuring device 160 can be used to be able to infer the operating state and the life of the synchronous generator 130.

The invention claimed is:

1. A generator for generating electric current, the generator comprising:
   a rotor;
   a stator having a plurality of stator teeth and a plurality of grooves arranged between the plurality of stator teeth, respectively, wherein the plurality of groves are configured to receive at least one stator winding;
   a strain gauge coupled between two adjacent stator teeth of the plurality of stator teeth and configured to measure a deflection, wherein the strain gauge is arranged in an air gap between the stator and the rotor; and
   a measuring device configured to receive a signal from the strain gauge indicative of the measured deflection.

2. The generator as claimed in claim 1, wherein the strain gauge is an electrical strain gauge or optical strain gauge.

3. The generator as claimed in claim 1, wherein the strain gauge is configured to determine a deflection of a stator tooth of the plurality of stator teeth from a change in signals generated by the measuring device.

4. The generator as claimed in claim 1, wherein the strain gauge spans two directly or indirectly adjacent stator teeth and extends in a tangential direction.

5. The generator as claimed in claim 1, wherein the strain gauge comprises an optical waveguide section arranged on support elements arranged at a distance from one another by way of a groove between adjacent stator teeth.

6. The generator as claimed in claim 5, wherein the optical waveguide section has a Bragg gratings and is positioned substantially centrally between adjacent stator teeth.

7. The generator as claimed in claim 5, wherein at least two optical waveguide sections are arranged on adjacent stator teeth by support elements, wherein the at least two optical waveguide sections have different orientations with respect to the groove.

8. The generator as claimed in claim 7, wherein the at least two optical waveguide sections are rotated 45° with respect to the groove.

9. The generator as claimed in claim 1, wherein the measuring device is configured to determine a torque of the generator.

10. The generator as claimed in claim 1, wherein the generator is at least one of a synchronous generator, an asynchronous generator or a doubly-fed asynchronous generator.

11. A method for operating a generator of a wind power installation, for generating electric current, the generator comprising a rotor and a stator having stator teeth and grooves arranged between the stator teeth for receiving a stator winding, the generator including a measuring device and at least one strain gauge, the method comprising:
    operating a strain gauge to determine a deflection of at least one stator tooth of the stator in connection with the generator, the strain gauge being arranged in an air gap between the stator and the rotor of the generator; and
    providing measurement values indicative of the deflection to the measuring device of the at least one stator tooth.

12. The method as claimed in claim 11, comprising actuating a field current of the generator depending on the determined deflection of the at least one stator tooth.

13. A wind power installation comprising the generator as claimed in claim 1.

14. A method for operating a wind power installation comprising:
    controlling a generator based on measurement values of one or more strain gauges, wherein the one or more strain gauges are arranged in an air gap between a stator and a rotor of the generator.

* * * * *